(12) United States Patent
Yokohari

(10) Patent No.: US 6,409,387 B1
(45) Date of Patent: Jun. 25, 2002

(54) BALL BUSHING

(75) Inventor: Isao Yokohari, Ibaraki (JP)

(73) Assignee: SMC Corporation, Tokyo (JP)

( * ) Notice: Subject to any disclaimer, the term of this patent is extended or adjusted under 35 U.S.C. 154(b) by 59 days.

(21) Appl. No.: 09/668,362

(22) Filed: Sep. 25, 2000

(30) Foreign Application Priority Data

Oct. 18, 1999 (JP) .......................................... 11-295972

(51) Int. Cl.[7] .............................................. F16C 29/06
(52) U.S. Cl. ...................................................... 384/43
(58) Field of Search ............................. 384/43, 44, 45; 464/168

(56) References Cited

U.S. PATENT DOCUMENTS 4,239,299 A * 12/1980 Hoffmann et al. ............ 384/43
4,480,879 A * 11/1984 Reith et al. .................. 384/43

* cited by examiner

*Primary Examiner*—Lenard A. Footland
(74) *Attorney, Agent, or Firm*—Oblon, Spivak, McClelland, Maier & Neustadt, P.C.

(57) ABSTRACT

In a ball bushing having a retainer for retaining a plurality of balls for rolling and an outer tube fitted on an outer face of the retainer, tapered portions inclined such that their diameters reduce as they extend outward are respectively formed at axial opposite end portions of an outer peripheral face of the outer tube, fixed portions formed of circumferential faces with uniform outer diameters are respectively provided on insides of the tapered portions, and a smaller-diameter portion with an outer diameter smaller than that of the fixed portions is formed at a tube intermediate portion positioned between the two fixed portions.

5 Claims, 3 Drawing Sheets

BALL BUSHING

TECHNICAL FIELD

The present invention relates to a ball bushing for supporting a rod for carrying out a linear motion or a rotational motion.

PRIOR ART

In general, in a ball bushing of this type, a cylindrical retainer is fitted into a cylindrical outer tube and a plurality of balls are respectively retained for rolling in a plurality of annular grooves formed in the retainer. The ball bushing is press-fitted into a bearing hole of a machine having a rod for carrying out a linear motion or a rotational motion and the rod is inserted into the retainer and guided by the balls, thereby allowing a smooth motion of the rod.

However, in the above prior-art ball bushing, press-fitting resistance may be too large to smoothly position the outer tube in the hole portion in some cases in press-fitting the outer tube into the bearing hole in the machine, which degrades operability or causes fitting in of the ball bushing in an inclined state. As a result, reduction in yield is likely to be cased. Particularly, if a whole outer peripheral face of the outer tube is formed into a circumferential face with a uniform diameter, large friction force is generated by total surface contact of the outer peripheral face of the outer tube and an inner peripheral face of the bearing hole in press-fitting the outer tube into the bearing hole. As a result, not only large press-fitting force is required for fitting in of the ball bushing, but also the outer tube is deformed inward by large stress that acts on the outer tube to hinder smooth rolling of the balls.

DISCLOSURE OF THE INVENTION

The present invention has been accomplished with the above problems in view and it is an object of the invention to provide a ball bushing which can reduce press-fitting force and an amount of deformation in fitting the ball bushing into a bearing hole in a machine and which can be easily and reliably fitted in.

To achieve the above object, according to the invention there is provided a ball bushing comprising a cylindrical retainer into which a rod for carrying out a linear motion or a rotational motion can be inserted, a plurality of balls respectively housed for rolling in a plurality of annular grooves cut in the retainer and in rolling contact with the rod, and an outer tube fitted on an outer face of the retainer for retaining the balls from outside, the ball bushing being used in a press-fitted state in a bearing hole of a machine having the rod.

The outer tube has tapered portions inclined such that diameters of the tapered portions reduce as the tapered portions extend outward respectively at axial opposite end portions of an outer peripheral face, fixed portions having uniform outer diameters and pressed against a hole face of the bearing hole respectively in positions adjacent to the respective tapered portions on insides of the tapered portions, and a smaller-diameter portion having an outer diameter smaller than that of the fixed portions at at least a portion of a tube intermediate portion positioned between the two fixed portions.

According to the ball bushing of the invention having the above structure, by forming the tapered portions at the opposite end portions of the outer tube, the ball bushing can be easily press-fitted into the bearing hole of the machine without inclination in a state in which axes are aligned with each other by using guide functions of the tapered portions. By forming the fixed portions pressed against the hole face of the-bearing hole at the opposite end portions of the outer tube and forming the smaller-diameter portion at the tube intermediate portion, contact area of the outer tube and the bearing hole can be reduced to reduce frictional resistance in press-fitting, thereby facilitating the press-fitting. Stress that acts on the outer tube is also reduced to suppress deformation of the outer tube, thereby ensuring smooth rolling of the balls.

According to a preferred concrete embodiment of the invention, the balls are disposed in a line throughout an area extending from one of the fixed portions to the other, the ball line inclines in such a direction as to gradually separate from the rod in positions corresponding to both the fixed portions, the respective balls are in rolling contact with the rod in the tube intermediate portion, the whole tube intermediate portion is formed as the smaller-diameter portion, and inner tapered portions respectively inclined in reverse directions to the tapered portions at the opposite ends of the outer tube are formed between the smaller-diameter portion and both the fixed portions.

The tapered portions at the opposite ends of the outer tube and the inner tapered portions have the same inclination angles.

In the invention, it is possible that the ball bushing is partitioned into a plurality of areas in an axial direction and that the plurality of annular grooves for respectively retaining the balls are formed in each the area.

DETAILED DESCRIPTION

Figure 1:
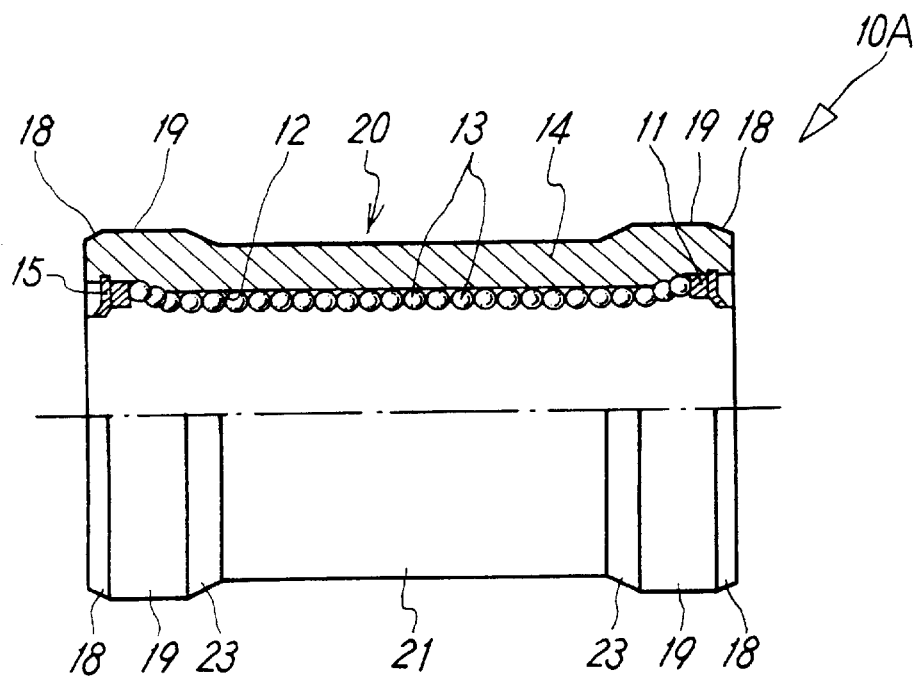
FIG. 1 is a side view of a first embodiment of a ball bushing according to the present invention with an upper half portion cut away.

Preferred embodiments of a ball bushing according to the present invention will be described below in detail based on the drawings. In description of the embodiments, portions having similar functions will be explained by providing similar reference numerals to them.

Figure 2:
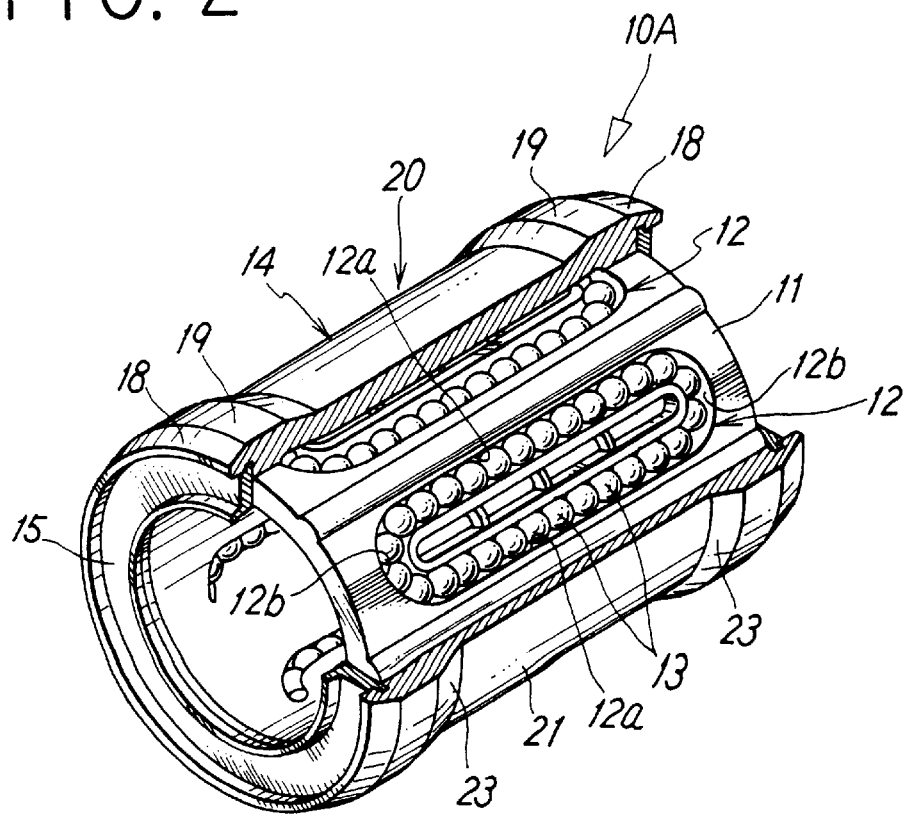
FIG. 2 is a perspective view of the ball bushing in FIG. 1 with a portion cut away.

A ball bushing 10A of a first embodiment shown in FIGS. 1 and 2 is formed of a cylindrical retainer 11, a plurality of balls 13 respectively housed for rolling in a plurality of annular grooves 12 cut in the retainer 11, a cylindrical outer tube 14 fitted on an outer face of the retainer 11 to retain the balls 13 from an outside, and snap rings 15 locked to opposite ends of the retainer 11 for fixedly retaining the retainer 11 in the outer tube 14.

The retainer 11 is made of material such as metal or synthetic resin. The three to eight annular grooves 12 are formed at regular angles in a circumferential direction in a tube wall of the retainer 11 and the balls 13 made of hard metal such as stainless steel are housed in the respective annular grooves 12 such that the balls 13 are ranged into a line and circulate while rolling in each the annular groove 12. The annular groove 12 is formed of two straight-line portions 12a, 12a extending in an axial direction of the retainer 11 and in parallel to each other and curved-line portions 12b, 12b smoothly connecting opposite end portions of both the straight-line portions 12a, 12a. A portion of a spherical surface of each the ball 13 projects from the annular groove 12 into a hollow portion of the retainer 11 and comes into rolling contact with an outer face of a rod 31 inserted into the hollow portion.

On the other hand, the outer tube 14 is made of metal material with excellent mechanical characteristic, wear resistance, heat resistance, and moldability and has tapered portions 18, 18 inclined such that their diameters reduce as they extend outward at axial opposite end portions of an outer periphery of the outer tube 14, fixed portions 19, 19 in shapes of circumferential faces with uniform outer diameters in positions adjacent to the respective tapered portions 18, 18 and on insides of the tapered portions 18, 18, and a smaller-diameter portion 21 formed throughout a tube intermediate portion 20 positioned between the two fixed portions 19, 19 and Ad -having an outer diameter smaller than that of the fixed portions 19, 19. Inner tapered portions 23, 23 inclined in reverse directions to the tapered portions 18, 18 on opposite ends of the outer tube 14 are formed between the smaller-diameter portion 21 and the respective fixed portions 19, 19 on opposite sides of the smaller-diameter portion 21. The inner tapered portions 23, 23 and the tapered portions 18, 18 on the opposite ends of the outer tube 14 have the same inclination angles. A preferred inclination angle is about 20°.

Each the annular groove 12 is formed to have such a length as to correspond to a whole area extending from the one fixed portion 19 of the outer tube 14 to the other fixed portion 19 and opposite end portions of the groove 12 are gradually inclined toward an outer periphery of the retainer 11 in positions corresponding to both the fixed portions 19, 19. In other words, the opposite end portions are inclined in such directions that the balls 13 fitted in the groove 12 gradually separate from the rod 31. The respective balls 13 in a position corresponding to the tube intermediate portion 20 are in rolling contact with the rod 31.

Figure 3:
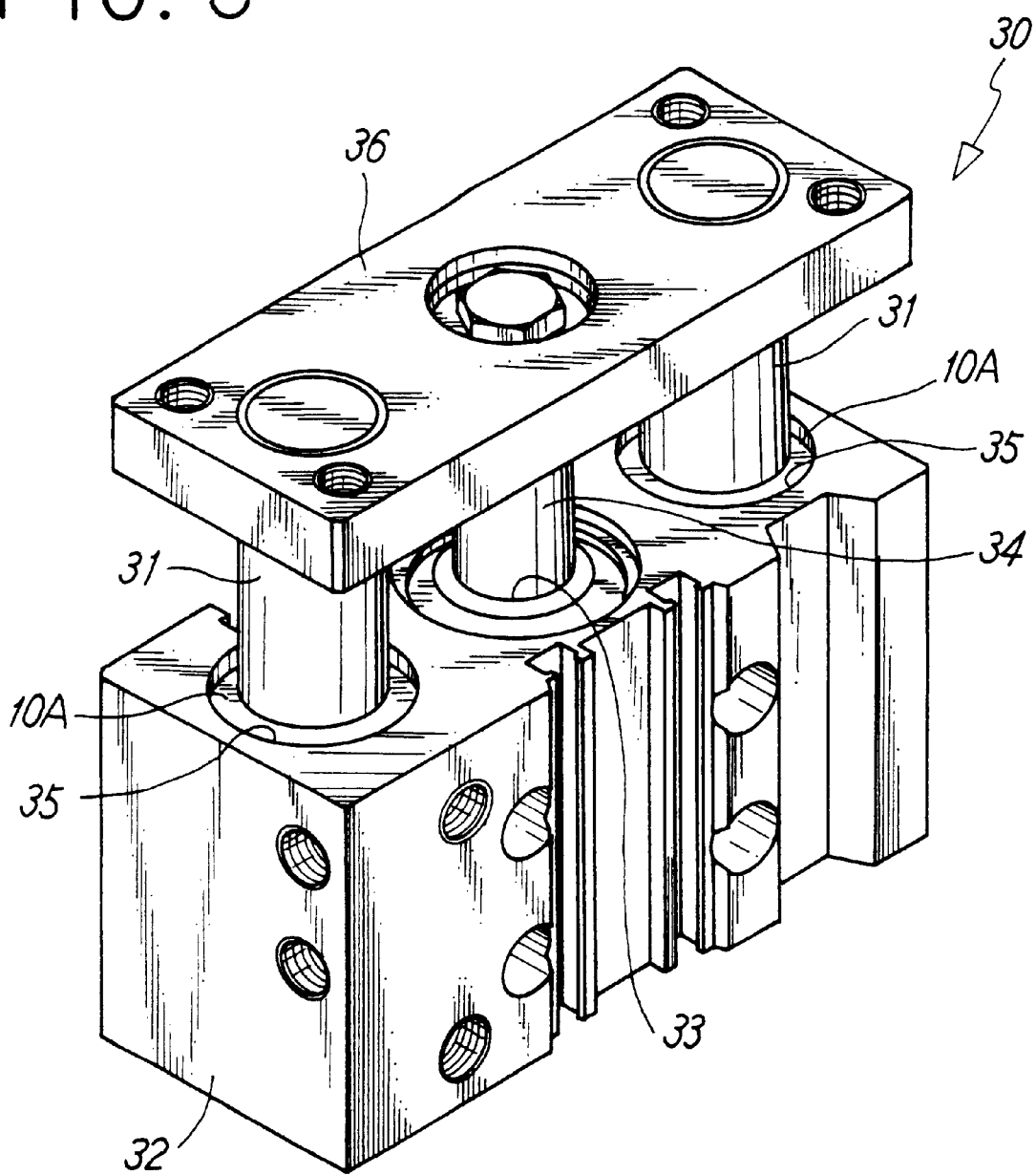
FIG. 3 is a perspective view of a cylinder with a guide having the above ball bushing.
Figure 4:
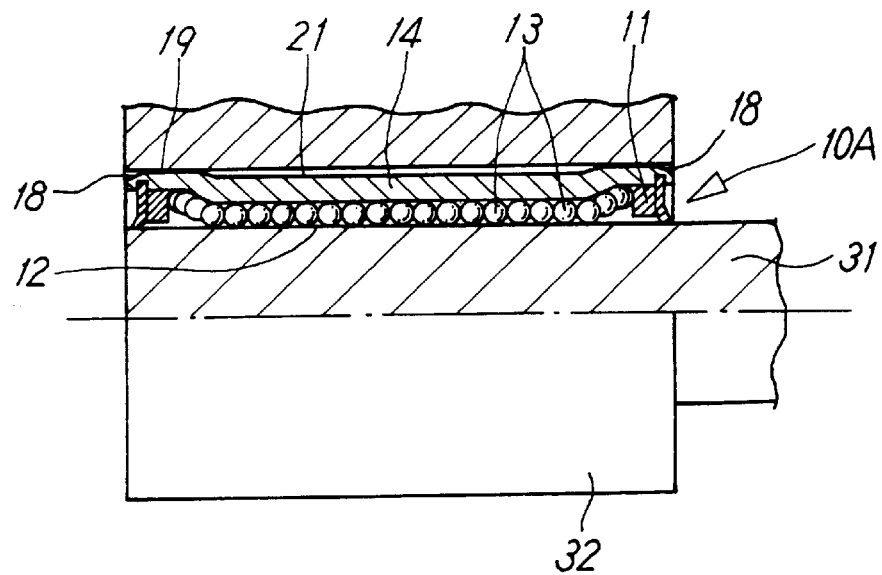
FIG. 4 is an enlarged sectional view of an essential portion showing the cylinder in FIG. 3 with a portion cut away.

The ball bushing 10A with the above structure is used for supporting and guiding of the guide rod 31 in a fluid pressure cylinder 30 with a guide, for example, as shown in FIG. 3. In other words, the fluid pressure cylinder 30 includes a cylinder bore 33 formed in an axial direction at a center in a casing 32 in a shape of a rectangular parallele piped, a piston for sliding in the cylinder bore 33 by operation of fluid pressure, a piston rod 34 connected to the piston and having a tip end projecting from the casing 32, two bearing holes 35, 35 formed in parallel to each other in positions adjacent to the cylinder bore 33 in the casing 32, the two guide rods 31, 31 inserted for sliding into the bearing holes 35, 35, and a plate 36 for connecting the guide rods 31, 31, and the piston rod 34. The above-described ball bushings 10A are respectively press-fitted into the respective bearing holes 35, 35. As shown in FIG. 4, by bringing the balls 13 into rolling contact with the guide rods 31 passing through the retainers 11, linear motion of the guide rods 31 is supported smoothly.

Here, by forming the tapered portions 18, 18 at the opposite end portions of the outer tube 14, the ball bushing with the above structure can be easily press-fitted into the bearing hole 35 without inclination in a state in which axes are aligned with each other by using guide functions of the tapered portions 18. Because the fixed portions 19, 19 pressed against a hole face of the bearing hole 35 are mainly formed at the opposite end portions of the outer tube 14 and the smaller-diameter portion 21 is formed at the tube intermediate portion 20, a contact area of the outer tube 14 and the bearing hole 35 is reduced to reduce frictional resistance in press-fitting and stress that acts on the outer tube 14 is reduced to suppress deformation of the outer tube 14, thereby ensuring smooth rolling of the balls 13. Even if minute deformation toward an inner diameter side is generated in the outer tube in positions of the fixed portions 19, 19 by the stress, the deformation does not hinder rolling property of the balls because the fixed portions 19, 19 are formed in positions where the ball lines are extending outward.

The ball bushing is reliably fixed in the bearing hole 35 because the fixed portions 19, 19 formed at the opposite end portions of the outer tube 14 come in close contact with the inner peripheral face of the bearing hole 35 with friction force. Fixing force at this time can be properly adjusted by a size of a width of the circumferential face constituting each of the fixed portions 19, 19. Therefore, although the fixing force can not be insufficient with the smaller-diameter portion 21 formed throughout the tube intermediate portion 20 like in the embodiment, a portion of the tube intermediate portion 20 may be formed as the smaller-diameter portion 21 and the rest of the tube intermediate portion 20 may be pressed against the bearing hole 35 if it is necessary to mount the ball bushing with larger fixing force.

Although the ball bushing of the invention has been described above in detail based on the one embodiment, the ball bushing of the invention is not limited to the above embodiment and various modifications may be made without departing from the sprit of the invention defined in claims.

Figure 5:
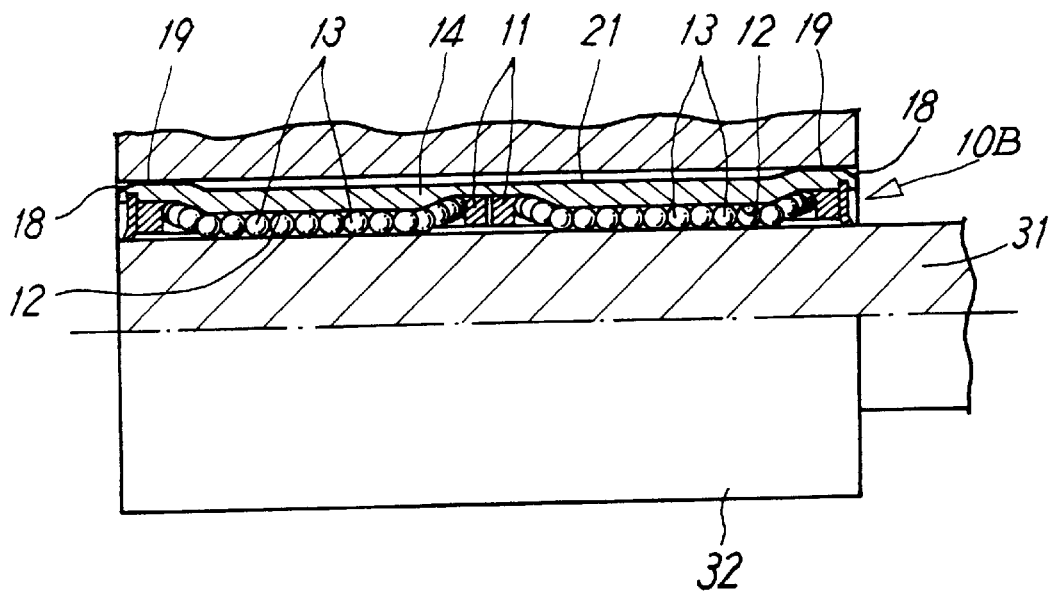
FIG. 5 is a sectional view of an essential portion showing a second embodiment of the ball bushing of the invention in a state in which the ball bushing is mounted to the cylinder with the guide.

For example, a ball bushing 10B of a second embodiment shown in FIG. 5 is partitioned into a plurality of areas in an axial direction and a plurality of annular grooves 12 for retaining balls 13 are formed in each the area. In the example shown in FIG. 5, two retainers 11, 11 in each of which the balls 13 are respectively retained in three to eight annular grooves 12 formed in a circumferential direction are respectively fitted in a right half portion and a left half portion of one outer tube 14. However, instead of housing the plurality of retainers in the one outer tube 14 like in this example, it is also possible to fit one retainer formed by integrating a plurality of above-described retainers into one in the outer tube 14.

As can be understood from the above description, according to the ball bushing of the invention, press-fitting force and a deformation amount in fitting the ball bushing into the bearing hole of the machine and the like can be reduced and the ball bushing can be easily and reliably fitted in.

What s claimed is:

1. A ball bushing comprising a cylindrical retainer into which a rod for carrying out a linear motion or a rotational motion can be inserted, a plurality of balls respectively housed for rolling in a plurality of annular grooves cut in said retainer and in rolling contact with said rod, and an outer tube fitted on an outer face of said retainer for retaining said balls from outside, said ball bushing being used in a press-fitted state in a bearing hole of a machine having said rod, wherein said outer tube has tapered portions inclined such that diameters of said tapered portions reduce as said tapered portions extend outward respectively at axial opposite end portions of an outer peripheral face, fixed portions having uniform outer diameters and pressed against and fixed to a hole face of said bearing hole respectively in positions adjacent to said tapered portions on insides of said tapered portions, and a smaller-diameter portion having an outer diameter smaller than that of said fixed portions at at least a portion of a tube intermediate portion positioned between said two fixed portions.

2. A ball bushing according to claim 1, wherein said balls are disposed in a line throughout an area extending from one of said fixed portions to the other, said ball line inclines in such a direction as to gradually separate from said rod in positions corresponding to both said fixed portions, said respective balls are in rolling contact with said rod in said tube intermediate portion, said whole tube intermediate portion is formed as said smaller-diameter portion, and inner tapered portions respectively inclined in reverse directions to said tapered portions at said opposite ends of said outer tube are formed between said smaller-diameter portion and both said fixed portions.

3. A ball bushing according to claim 2, wherein said tapered portions at said opposite ends of said outer tube and said inner tapered portions have the same inclination angles.

4. A ball bushing according to claim 2, wherein said ball bushing is partitioned into a plurality of areas in an axial direction and said plurality of annular grooves for respectively retaining said balls are formed at regular angles in a circumferential direction in each said area.

5. A ball bushing according to claim 1, wherein said ball bushing is partitioned into a plurality of areas in an axial direction and said plurality of annular grooves for respectively retaining said balls are formed at regular angles in a circumferential direction in each said area.

* * * * *